UNITED STATES PATENT OFFICE.

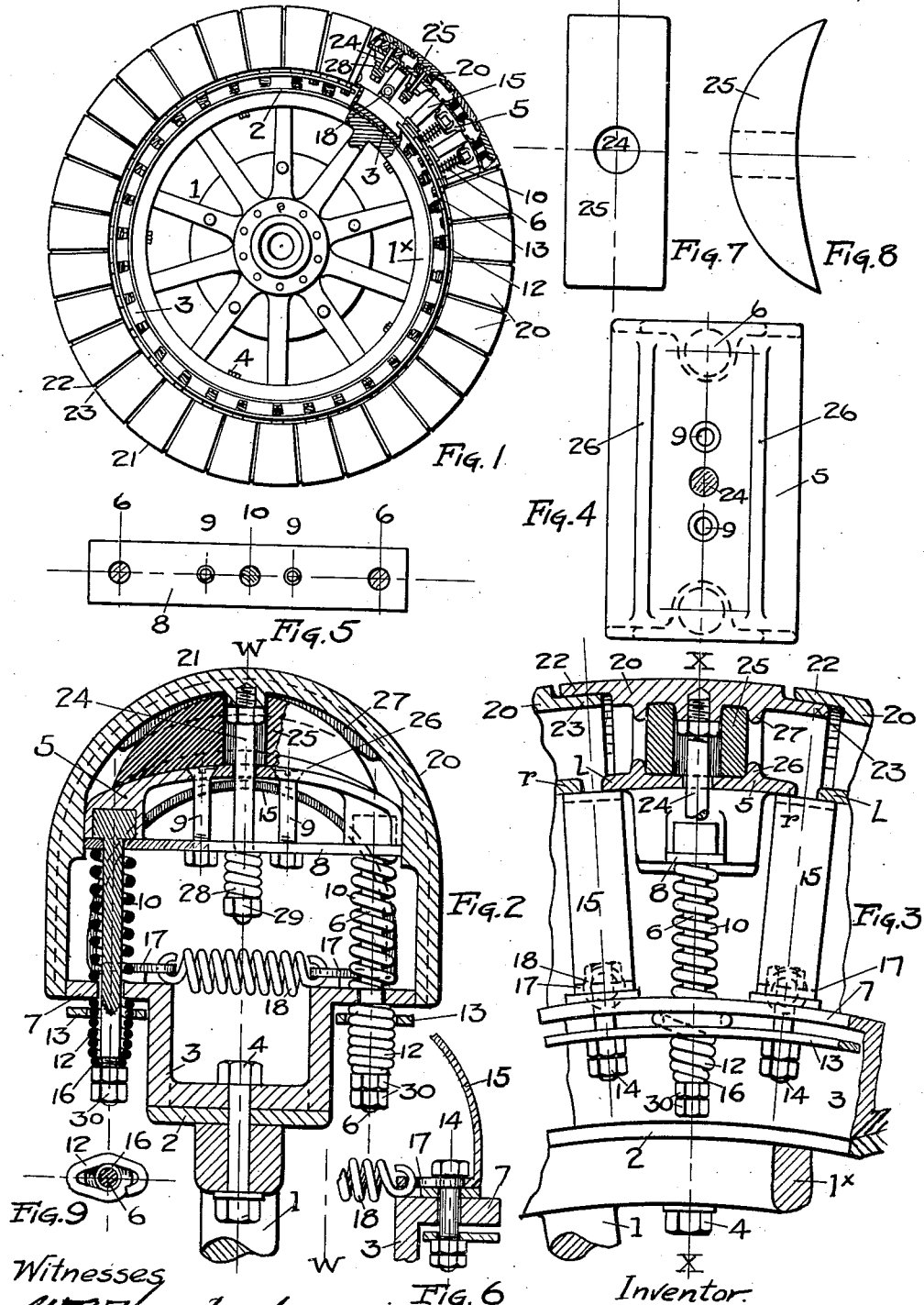

HENRY M. BAGDIGIAN, OF WORCESTER, MASSACHUSETTS.

RESILIENT TIRE FOR WHEELS OF MOTOR-VEHICLES, &c.

1,018,027.

Specification of Letters Patent. Patented Feb. 20, 1912.

Application filed September 29, 1911. Serial No. 651,975.

*To all whom it may concern:*

Be it known that I, HENRY M. BAGDIGIAN, a subject of the Turkish Empire, residing at Worcester, in the county of Worcester and State of Massachusetts, have invented a new and useful Improvement in Resilient Tires for Wheels of Motor-Vehicles, &c., of which the following is a specification, reference being made therein to the accompanying drawings.

This invention relates to a novel construction for the tires or outer rims of wheels designed to be used on automobiles, motor-trucks and other vehicles; the object of my invention being to provide an automatically resilient metal tire or mechanical tire-mechanism adapted to be removably attached to the periphery of the wheel; said tire being composed of a series of assembled individually yieldable sections of the peculiar character and construction substantially as hereinafter more fully explained. Also to provide a spring tire section that can be readily detached and separately dismantled and reassembled with practical facility. These objects I attain by the mechanism illustrated in the accompanying drawings, wherein—

Figure 1 represents a side elevation view of my improved tire as applied upon a wheel, a few of the tire elements being shown in section. Fig. 2 represents, on a somewhat larger scale, a cross section of the tire mechanism at about the line X X on Fig. 3. Fig. 3 represents a sectional view taken in the direction of the plane of the wheel at about the line W on Fig. 2. Fig. 4 represents a separate top plan view of the movable seat or resistance-plate. Fig. 5 is a plan view of the cross-piece or bottom member of the seat-plate. Fig. 6 is a fragmentary sectional view showing one foot of the bow-spring member. Fig. 7 represents a separate plan view of the elastic cushion used between the outside shoe and resistance plate. Fig. 8 is a side view of the same, and Fig. 9 is a plan detail showing the end of one of the balance springs.

Referring to the drawings, the numeral 1 indicates the wheel and $1^x$ the felly or circumferential rim thereof, which may be provided with a metal rim-band 2 fixed thereon, or otherwise.

3 indicates the bed or base member, or tire-supporting rim, of my improved tire; said member preferably consisting of a circumferentially channeled laterally flanged circular rim, its inner face adapted to fit over the peripheral rim of the wheel, to which it may be secured by bolts 4 arranged radially through the parts, as shown. About this circular rim 3, and in yielding connection therewith, I provide a series of independently acting spring-sections of the peculiar construction and operation hereinafter explained; the number of said sections being sufficient to fill the peripheral circle, the same being more or less as required in any instance. Each of these spring sections are of similar construction, and a description of one will therefore apply to all and give an understanding of the whole. The mechanism thereof as shown, consists of a transversely arched seat or resistance-plate 5 connected at each end with a bolt 6 that slides through a hole in the flange 7 of the rim 3, one at one side of the rim and one at the other. The bolts are held to the resistance-plate 5 by a bottom-piece 8 attached to said plate by the screws 9.

The numerals 10 and 12 indicate springs arranged about the respective bolts 6 above and below the flanges 7, and normally exerting their force to press the plate 5 outward or away from the rim 3. These springs are herein termed balance springs; those marked 10 are push springs, and those marked 12 are pull springs. The head coil of spring 12 is broadened (see Fig. 9) and is confined against the flange 7 by an inner clamping-rim or member 13, secured to the flange by bolts 14, while the lower end coil of said spring is contracted and secured to the neck of the bolt 6, as at 16, so that downward movement of the bolt stretches said spring 12 and the pull tension of the spring aids in supporting the resistance-plate 5 and maintaining the load.

Numeral 15 indicates a transversely arched bow-spring, its lower ends offset and turned inward to form a slotted foot, as at 17 (see Fig. 6), and connected across from one to the other by a pull spring 18, so that the bearing foot of said bow-spring can slide in a direction transverse to the rim. The outwardly arched portion of said flat bow spring is disposed for supporting the adjacent edges $r$ and $l$ of two sections or resistance-plates 5 (see Fig. 3) for keeping said plates approximately in fair alinement with each other as they act.

20 indicates the outside metal shoe or face of the section, covering and inclosing the other parts. Said section has a rounded tread face at 21, and is guided at either side against the ends of the plate 5, or its cross-piece 8, and the opposite edges of the flanges 7, and adapted to move in and out with the yielding and resilient action of the resistance springs as the wheel rolls along the way. The adjacent edges 22 and 23 of the shoe sections are made to overlap each other as scales, as indicated on Fig. 3. The outer shoe 20 and resistance plate 5 are confined to each other by a radially disposed center bolt 24; and a crescent-shaped elastic cushion 25 of rubber or other suitable substance is arranged between the plate 5 and shoe 20. Each of said parts is provided with ribs 26 and 27, as best shown in Figs. 3 and 4, for retaining the cushion in position. The bolt 24 is fixed in the shoe and passes down through a hole in the elastic cushion and plate 5, and is provided with a yielding fastening means, as spring 28 and nut 29, on its inner end, (see Fig. 2) which construction allows play for the compression of the cushion to a sufficient degree while confining the shoe in proper relation.

By removing the nuts 30 from the bolts or rods 6 the entire section, including all but springs 12 and 15, can be disconnected bodily from the supporting-rim 3, or reassembled therewith, so that repairs or renewals of parts can be readily and conveniently accomplished without dismantling the entire tire.

When in operation upon a traveling wheel, each successive section performs its share of the work; the resistance plate 5 and its springs 10 and 12 sustain the load and afford the balancing resilience. The bow springs rapidly augment the resistance as the compression increases; while the outer shoe 20 takes the wear of the road, and the elastic cushions in a great measure absorb the shocks and jar of passing over small irregularities of surface, such as occur in the roads.

What I claim and desire to secure by Letters Patent, is—

1. A metallic spring tire of the character described; comprising an oppositely flanged circular rim adapted for fitting upon the periphery of the wheel, a series of yieldable resilient sections forming the circumferential exterior thereon, each section composed of a seat member or resistance-plate, a pair of connecting bolts secured in the ends of said plate and respectively sliding through holes in the flanges of said rim, coil-springs arranged on said rods for sustaining the resistance plate, an arched bow-spring beneath the edges of the adjacent plate members, a radially yieldable outer shoe inclosing the said parts, a crescent-shaped elastic cushion between the resistance seat plate and shoe, and means securing the outer shoe and plate together and affording yielding action thereof.

2. In a resilient metallic tire mechanism of the class described, comprising a flanged tire-supporting rim, and a series of yieldable sections thereon, each including a resiliently movable resistance-plate and tension springs therefor; the combination therewith of the transversely positioned bow-springs acting beneath said resistance plates, the ends thereof formed with an inwardly offset slotted foot, slidably supported in connection with the tire-supporting rim, and a pull spring-coil uniting one foot with the other across the rim, substantially as set forth.

3. In a resilient tire mechanism comprising a mounting-rim and series of automatic resilient acting sections thereon, of the character described; the combination with the mounting-rim, the movable resistance-plates connected with radial bolts passing through holes in said rim; of the outer and inner balance springs arranged about said bolts for sustaining said plate, the inclosed springs exerting expanding tension, the projecting springs being pull-springs, the heads of said pull springs being spread and secured to the flanged rim by an attached clamping band or member, and the other end thereof being contracted and secured to the neck of the guiding-bolt, and retaining nuts on said bolts that facilitate disconnection of the tire-sections from said rim, substantially as set forth.

4. A mechanical tire, comprising a centrally channeled, laterally flanged supporting-rim, and a series of resilient sections mounted thereon; said sections each provided with a resiliently supported externally ribbed transverse plate, a pair of guide-bolts therefor having their heads confined to said plate near its ends, a bolt-attaching cross-piece secured thereto, said bolts extending through and slidable in said supporting rim, resilient balance springs coiled about said bolts, an internally ribbed outside shoe fitting over the section and guided against the ends of said transverse plate and the edges of the rim flanges, the transverse edges of said outer shoe being fitted to overlap with the next adjacent section, a cushion spring disposed between said plate and shoe and confined by the ribs thereon, and a shoe-retaining bolt passing through said cushion and plate and provided with a yieldable fastening means below the cross-piece, for the purposes set forth.

Witness my hand this 28th day of September, 1911.

HENRY M. BAGDIGIAN.

Witnesses:
　CHAS. H. BURLEIGH,
　EDWIN WESLEY JENKINS.

Copies of this patent may be obtained for five cents each, by addressing the "Commissioner of Patents, Washington, D. C."